April 22, 1969
J. SPITERI
3,440,415
TRAILER LIGHTING ARRANGEMENT
Filed Dec. 5, 1966
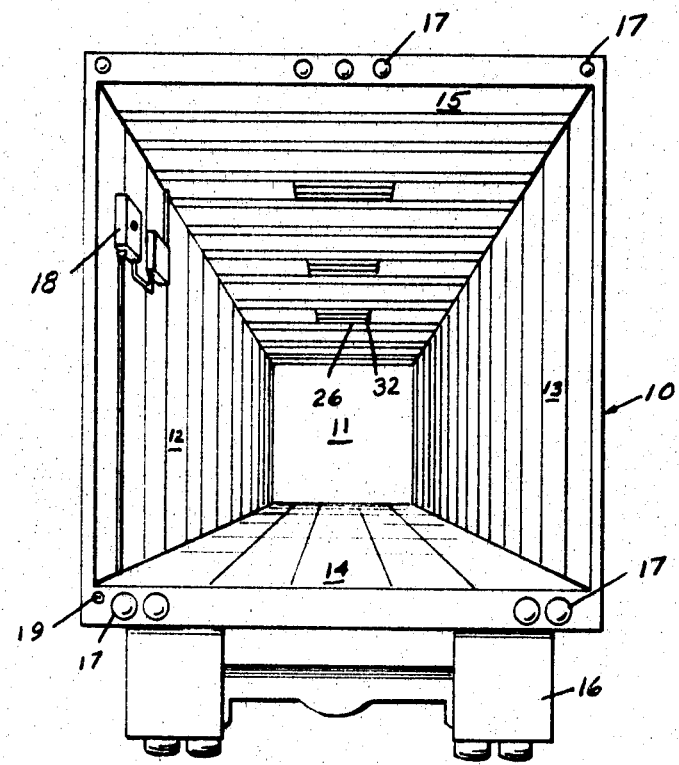
FIG. 1
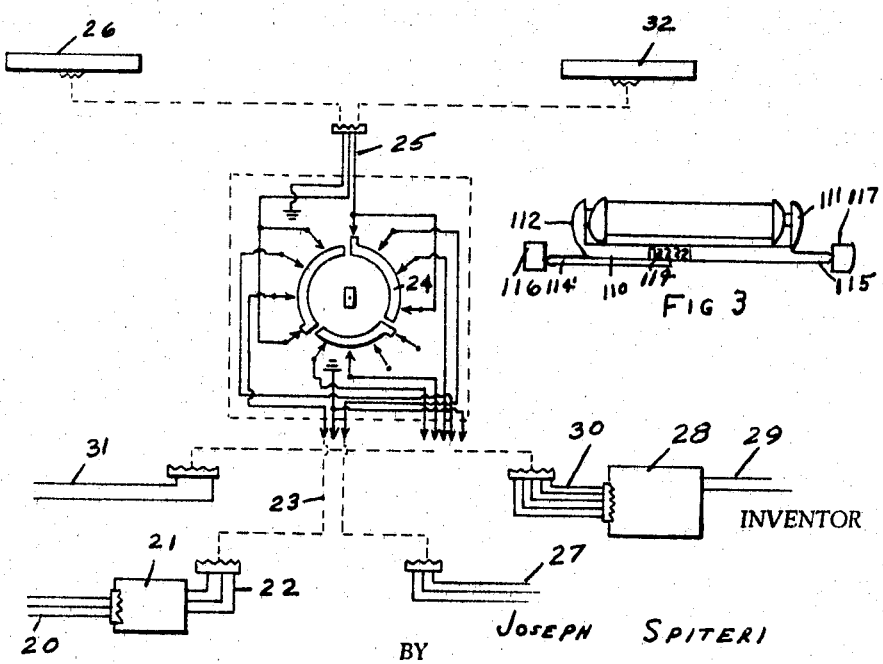
FIG. 2
FIG. 3
INVENTOR
JOSEPH SPITERI
BY Charles L. Lovercheck
ATTORNEY

United States Patent Office 3,440,415
Patented Apr. 22, 1969

3,440,415
TRAILER LIGHTING ARRANGEMENT
Joseph Spiteri, Erie, Pa., assignor to Morlite Equipment Company, Girard, Pa., a corporation of Pennsylvania
Filed Dec. 5, 1966, Ser. No. 599,240
Int. Cl. B60q 3/06
U.S. Cl. 240—7.1          1 Claim

ABSTRACT OF THE DISCLOSURE

A trailer arrangement having fluorescent and incandescent lamps. A switching device is provided to selectively operate the incandescent and fluorescent lamps. The incandescent and fluorescent lamps are both operated by direct or alternating current.

---

It is an object of the invention to provide a simple, inexpensive lighting arrangement specifically designed to illuminate the inside area of an automotive freight trailer with sufficient light to enable the user to read the labels on parcels and other freight.

Another object of the invention is to provide a trailer lighting system which is detachable from the trailer.

Yet another object is to provide an improved removable light fixture.

Another object of the invention is to provide a trailer lighting system which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

In the drawings:

FIG. 1 is a rear view of a truck trailer with lights installed therein,

FIG. 2 is a schematic view of light circuit according to the invention,

FIG. 3 is a view of a removable light bracket.

Now with more particular reference to the drawings, the trailer 10 shown as an inside package receiving area enclosed by front 11, side walls 12 and 13, bottom platform 14, and roof 15. The trailer is supported on the usual undercarriage 16. The trailer has the position lights 17 which are operated from the power source of the towing vehicle or tractor.

The lighting system 18 is connected to a plug 19 which may be connected to a suitable source of dock voltage and by suitable cable arrangement to the connections of the towing vehicle or tractor.

The towing vehicle or tractor will ordinarily have a source of direct current power, such as for example, a voltage regulated at 13 volts D.C.

In order for the trailer lights to be operated at a dock during unloading when the tractor is disconnected from the trailer or when the tractor power supply is not operating, the plug 19 may be connected to a source of alternating current power on the dock. The plug 19 will normally be connected to the wires 20 which will be connected through a stepdown transformer 21 and to wires 22 indicated in conduit 23 to the switch 24. The switch 24 will be connected through wires 25 to the panel indicated at 26 which will contain a suitable number of incandescent lamps. The cables 27 will likewise be connected to the plug 19. They will likewise be connected at their other ends to the switch 24.

The inverter 28 will be connected by the wires 29 to the direct current source of power from the truck tractor. The inverter which will be of a suitable type to produce 120 volts A.C. from 12 volts D.C. will be connected through the wires 30 to the switch 24.

The wires 31 like the wires 29 are connected to the source of direct current power on the tractor.

A fluorescent lamp fixture is indicated at 32 which is mounted in the top 15 of the trailer and as many banks of fluorescent tubes as desired can be mounted in the top. The banks of incandescent tubes 26 are likewise mounted in the trailer top and they can be mounted in the same fixture as the fluorescent tubes if this fixture is properly designed to accommodate them.

Thus, either the fluorescent lights or the incandescent lights can be operated from either a source of alternating current at the loading dock or from the tractor direct current power supply through the inverter. Likewise the incandescent lights can be operated from the alternating current force through the stepdown transformer 21 when the truck trailer is parked at the loading dock or the same incandescent lights may be operated when the trailer is in transit directly from the tractor D.C. voltage supply.

FIGURE 3 shows a removable fixture 110 having brackets 111 and 112 urged apart by spring 114. Points 114 and 115 are urged into two spaced cleats 116 and 117 in the truck body.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. A trailer lighting system comprising
   a source of direct current power,
   a source of alternating current power,
   a transformer,
   a switch,
   an incandescent lamp,
   means connecting said source of alternating current to said transformer,
   means connecting said transformer to said switch,
   means connecting said source of alternating current to said switch,
   means connecting said incandescent lamp to said switch,
   said switch being adapted to selectively connect said transformer to said incandescent lamp and said source of direct current power to said incandescent lamp, whereby said lamp can be operated by said alternating current source or can be operated from said source of direct current power,
   a fluorescent lamp being provided,
   means connecting said fluorescent lamp to said switch,
   said switch being adapted to connect said fluorescent lamp to said source of alternating current power to said fluorescent lamp,
   an inverter being provided,
   means connecting said inverter to said switch, means connecting said inverter to said source of direct current power,
said switch being adapted to connect said fluorescent lamp to said inverter,
a trailer being provided and said fluorescent lamp is disposed in said trailer.

References Cited

UNITED STATES PATENTS

| 2,476,517 | 7/1949 | Titus. | |
| 2,764,673 | 9/1956 | McClintock | 240—37 XR |
| 2,932,727 | 4/1960 | Larsen | 240—7.1 |
| 3,005,130 | 10/1961 | Schwartz. | |
| 3,336,472 | 8/1967 | Steinig | 240—37.1 |
| 3,191,019 | 6/1965 | Rijnders et al. | 240—8.3 |

JOHN M. HORAN, *Primary Examiner.*

CHARLES E. SMITH, *Assistant Examiner.*

U.S. Cl. X.R.

240—37